United States Patent
Iyer et al.

(10) Patent No.: US 12,313,527 B2
(45) Date of Patent: May 27, 2025

(54) DIGITAL MICROFLUIDIC SYSTEMS, CARTRIDGES, AND METHODS INCLUDING INTEGRATED REFRACTIVE INDEX SENSING

(71) Applicant: Nicoya Lifesciences Inc., Kitchener (CA)

(72) Inventors: Krishna Iyer, Waterloo (CA); Ryan Denomme, Kitchener (CA)

(73) Assignee: Nicoya Lifesciences Inc., Kitchener (CA)

( * ) Notice: Subject to any disclaimer, the term of this patent is extended or adjusted under 35 U.S.C. 154(b) by 236 days.

(21) Appl. No.: 17/814,210

(22) Filed: Jul. 21, 2022

(65) Prior Publication Data

US 2023/0009923 A1 Jan. 12, 2023

Related U.S. Application Data

(63) Continuation of application No. PCT/CA2021/050065, filed on Jan. 22, 2021.
(Continued)

(51) Int. Cl.
| | |
|---|---|
| *G01N 21/03* | (2006.01) |
| *B01L 3/00* | (2006.01) |
| *G01N 21/41* | (2006.01) |

(52) U.S. Cl.
CPC ........ *G01N 21/03* (2013.01); *B01L 3/502784* (2013.01); *G01N 21/4133* (2013.01);
(Continued)

(58) Field of Classification Search
CPC .. G01N 21/03; G01N 21/4133; G01N 21/553; G01N 21/658; G01N 2021/035;
(Continued)

(56) References Cited

U.S. PATENT DOCUMENTS

| | | | |
|---|---|---|---|
| 8,693,003 B2 | 4/2014 | Nieva et al. | |
| 9,322,823 B2 | 4/2016 | Denomme et al. | |

(Continued)

FOREIGN PATENT DOCUMENTS

| | | |
|---|---|---|
| CA | 2678772 A1 | 8/2008 |
| CA | 2846909 A1 | 9/2014 |

(Continued)

OTHER PUBLICATIONS

PCT/CA2021/050065 International Search Report and Written Opinion dated Jul. 29, 2021.
(Continued)

*Primary Examiner* — Hoa Q Pham
(74) *Attorney, Agent, or Firm* — Quarles & Brady LLP

(57) ABSTRACT

A digital microfluidic (DMF) system, DMF cartridge, and method including integrated refractive index (RI) sensing is disclosed. The digital microfluidic DMF system and DMF cartridge may include, for example, a RI sensor (or sensor surface) directly in the droplet operations gap of a DMF cartridge. The digital microfluidic DMF system may include, for example, the DMF cartridge, one or more illumination sources, one or more optical measurement devices, and a controller. Additionally, a method of using the DMF system and DMF cartridge that includes integrated RI sensing is provided.

20 Claims, 16 Drawing Sheets

Related U.S. Application Data

(60) Provisional application No. 62/964,431, filed on Jan. 22, 2020.

(52) U.S. Cl.
CPC ... *B01L 2200/04* (2013.01); *B01L 2300/0636* (2013.01); *B01L 2300/0645* (2013.01); *B01L 2400/0427* (2013.01); *G01N 2021/035* (2013.01)

(58) Field of Classification Search
CPC .......... G01N 2021/258; G01N 33/5438; B01L 3/502784; B01L 3/502792; B01L 2200/04; B01L 2300/0636; B01L 2300/0645; B01L 2400/0427
USPC ................. 356/445–448, 432–440, 128–137
See application file for complete search history.

(56) References Cited

U.S. PATENT DOCUMENTS

| | | | |
|---|---|---|---|
| 10,794,904 | B2 | 10/2020 | Denomme et al. |
| 11,278,890 | B2 | 3/2022 | Denomme et al. |
| 11,598,771 | B2 | 3/2023 | Denomme et al. |
| D983,682 | S | 4/2023 | Lubjenka et al. |
| 2003/0012483 | A1 | 1/2003 | Ticknor et al. |
| 2005/0056569 | A1* | 3/2005 | Yuan .................. G01N 27/745 209/215 |
| 2010/0045995 | A1* | 2/2010 | Malic .................. B82Y 30/00 356/246 |
| 2015/0352544 | A1 | 12/2015 | Buermann et al. |
| 2019/0092623 | A1 | 3/2019 | Ding et al. |
| 2021/0331175 | A1* | 10/2021 | Denomme ........... G01N 21/554 |
| 2023/0017547 | A1* | 1/2023 | Iyer .................... G01N 21/6428 |

FOREIGN PATENT DOCUMENTS

| | | |
|---|---|---|
| CA | 3061157 A1 | 3/2020 |
| CN | 110441258 A * | 11/2019 |
| EM | 0080464110001 | 10/2020 |
| JP | H05240872 A | 9/1993 |
| JP | 2004163257 A * | 6/2004 |
| WO | 2004036194 A1 | 4/2004 |
| WO | 2009090985 A1 | 7/2009 |
| WO | 2010010904 A1 | 1/2010 |
| WO | WO-2011002957 A2 | 1/2011 |
| WO | WO-2011130844 A1 | 10/2011 |
| WO | WO-2019153067 A1 | 8/2019 |
| WO | WO-2019236682 A1 | 12/2019 |
| WO | WO-2020031089 A1 | 2/2020 |
| WO | WO-2020049524 A1 | 3/2020 |
| WO | WO-2020061715 A1 | 4/2020 |
| WO | WO-2020065537 A1 | 4/2020 |
| WO | WO-2020186360 A1 | 9/2020 |
| WO | WO-2021097582 A1 | 5/2021 |
| WO | WO-2021146804 A1 | 7/2021 |
| WO | WO-2021146809 A1 | 7/2021 |
| WO | WO-2021168578 A1 | 9/2021 |
| WO | WO-2021212235 A1 | 10/2021 |
| WO | WO-2022051840 A1 | 3/2022 |
| WO | WO-2022082316 A1 | 4/2022 |
| WO | WO-2022164756 A2 | 8/2022 |
| WO | WO-2022165589 A1 | 8/2022 |
| WO | WO-2022187931 A1 | 9/2022 |
| WO | WO-2022187954 A1 | 9/2022 |
| WO | WO-2022221946 A1 | 10/2022 |
| WO | WO-2022221947 A1 | 10/2022 |
| WO | WO-2022246569 A1 | 12/2022 |
| WO | WO-2023004516 A1 | 2/2023 |
| WO | WO-2023039678 A1 | 3/2023 |
| WO | WO-2023147672 A1 | 8/2023 |
| WO | WO-2023147674 A1 | 8/2023 |
| WO | WO-2023168521 A1 | 9/2023 |
| WO | WO-2023178432 A1 | 9/2023 |

OTHER PUBLICATIONS

European Patent Office, Extended European Search Report, Application No. 21745003.0, Dec. 21, 2023, 8 pages.

Japanese Patent Office, Notice of Reasons for Refusal, Application No. 2022-540572, Nov. 15, 2024, 7 pages.

* cited by examiner

DIGITAL MICROFLUIDIC SYSTEMS, CARTRIDGES, AND METHODS INCLUDING INTEGRATED REFRACTIVE INDEX SENSING

CROSS-REFERENCE TO RELATED APPLICATIONS

This application is a continuation of PCT/CA2021/050065 filed on Jan. 22, 2021, which claims priority to U.S. Provisional Application No. 62/964,431 filed on Jan. 22, 2020; which are incorporated herein by reference.

TECHNICAL FIELD

The relates generally to optical sensing techniques and more particularly to a digital microfluidic system, cartridge, and methods making use of integrated refractive index (RI) sensing.

BACKGROUND

In digital microfluidics the use of optical sensing is well known. Optical sensing methods have been integrated into continuous flow microfluidics. Conventional methods for measuring optical stimuli from a DMF device make use of free-space optics to capture stimuli. Free-space optics suffer from stray light issues. The use of lenses, filters, and/or other similar optical components to resolve these issues can drive up the cost of the system. New approaches are needed for performing optical sensing in DMF devices that are processing discrete droplets.

SUMMARY

The present disclosure provides a cartridge for use with an instrument as well as systems comprising the cartridge functionally coupled to the instrument. The functional coupling may, for example, include electrical coupling, wireless electronic coupling, and/or optical coupling.

The cartridge makes use of digital microfluidics. The digital microfluidics typically includes a plurality of electrowetting electrodes operative to perform droplet operations on a liquid droplet in a droplet operations gap of the cartridge.

The cartridge makes use of a refractive index sensor. The refractive index sensor may be generally exposed to the droplet operations gap in proximity with one or more of the electrowetting electrodes. In this configuration, a droplet situated atop the one or more of the electrowetting electrodes will contact the refractive index sensor. The arrangement of the one or more of the electrowetting electrodes and the refractive index sensor establish a droplet interrogation site.

The refractive index sensor may be mounted on a top plate of the cartridge, e.g., integrated into or mounted on a gap-facing side of the top plate. The refractive index sensor may be mounted in the droplet operations gap. The droplet operations gap may be established by a top plate and bottom plate in substantially parallel planes. In an example, the bottom plate comprises the electrowetting electrodes. The refractive index sensor may be mounted in the droplet operations gap and may have a sensor face that at a right angle to the substantially parallel planes. The refractive index sensor may include a waveguide and/or be provided as a tip of a waveguide.

The cartridge may include multiple droplet interrogation sites. Individual interrogation sites may be operated in parallel or sequentially. Subsets of interrogation sites may be operated in parallel or sequentially. Interrogation sites may each interrogate for the same set of analytes or for different sets of analytes. Interrogation sites may each interrogate single analytes or multiple analytes.

The present disclosure provides a system comprising a cartridge and an instrument. The instrument includes electronics and other components for controlling the cartridge, gathering data from the cartridge (such as optical or temperature data), and a means for mounting the cartridge to effect electronic coupling, measurement and control. The system may include one or more illumination sources configured to illuminate the droplet interrogation site or sites. The illumination source or sources may be situated on the cartridge and/or on the instrument.

The system may include one or more optical measurement devices configured to sense light from the droplet interrogation site or sites. The optical measurement device or devices may be situated on the cartridge and/or on the instrument. The arrangement of an illumination source and an optical measurement device with respect to a droplet interrogation site may be selected for operation in transmission mode. The arrangement of an illumination source and an optical measurement device with respect to a droplet interrogation site may be selected for operation in reflection mode. The system may include a scanning optical measurement device configured to scan multiple droplet interrogation sites.

The present disclosure provides a method of conducting an assay using the systems of the present disclosure. The method may include loading a sample droplet into the droplet operations gap, e.g., using electrowetting-mediated droplet operations. The method may include conducting one or more sample processing steps on the sample droplet to yield an analysis-ready droplet. The method may include conducting a refractive index analysis of an analysis ready-droplet at a droplet interrogation site.

BRIEF DESCRIPTION OF DRAWINGS

Figure 1:
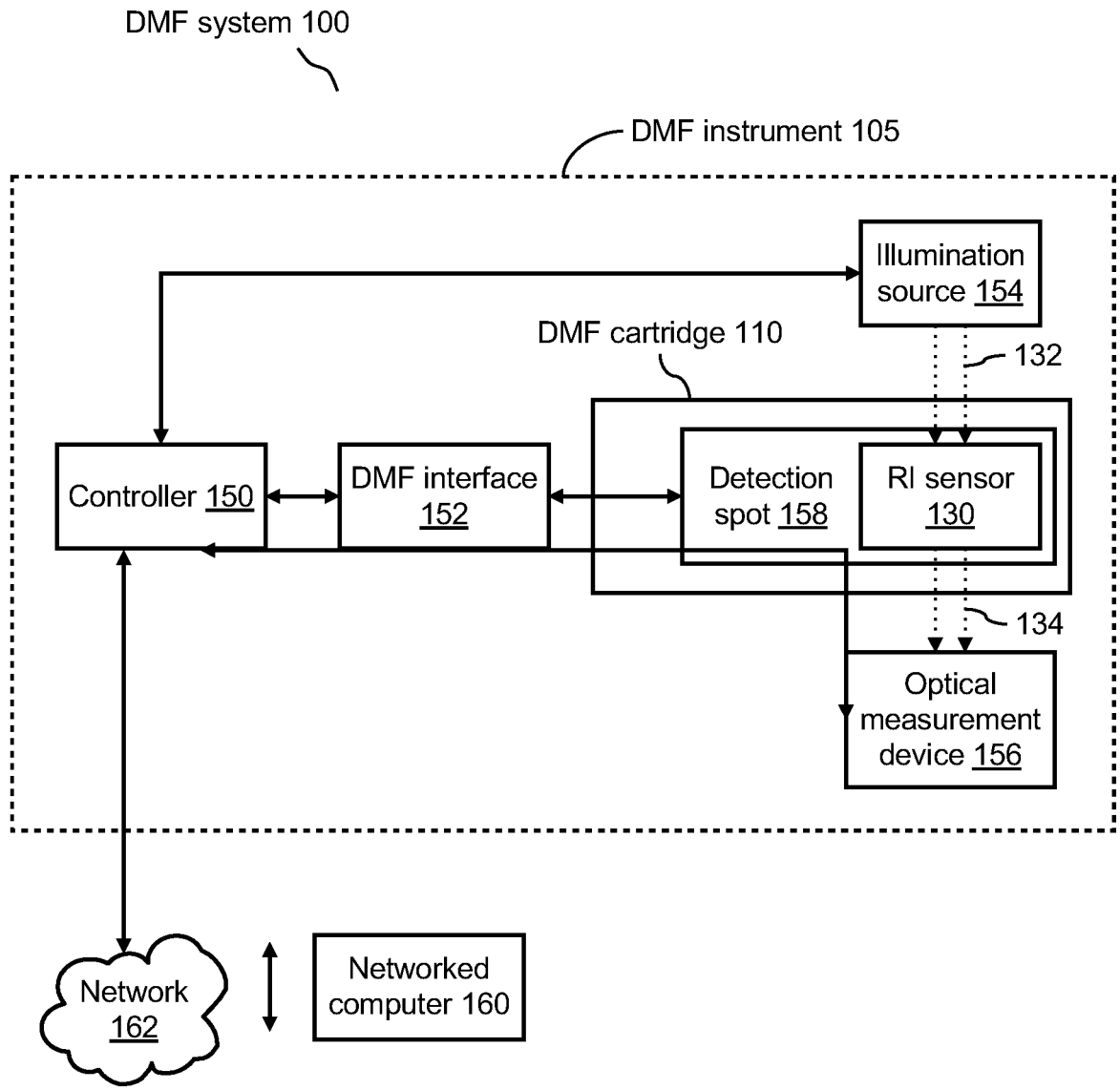
Figure 2:
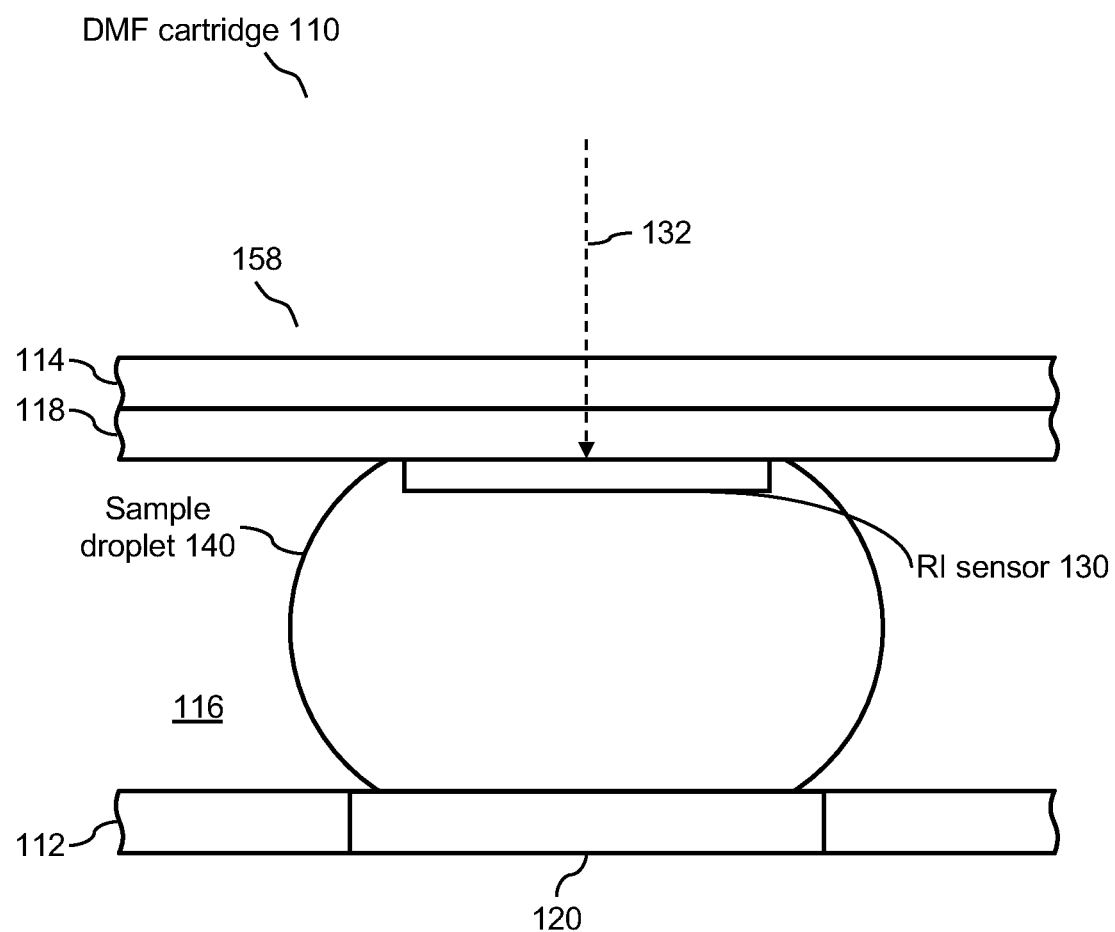
Figure 3:
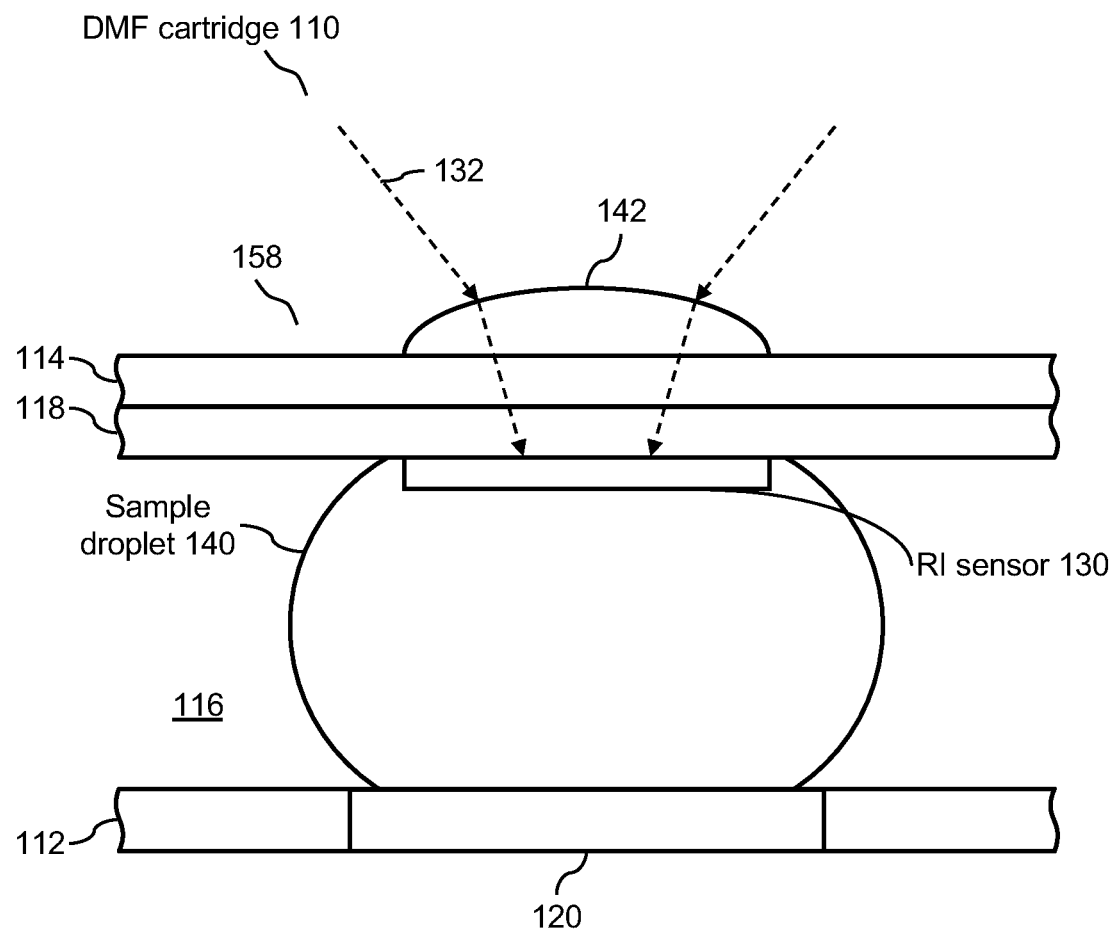
Figure 4:
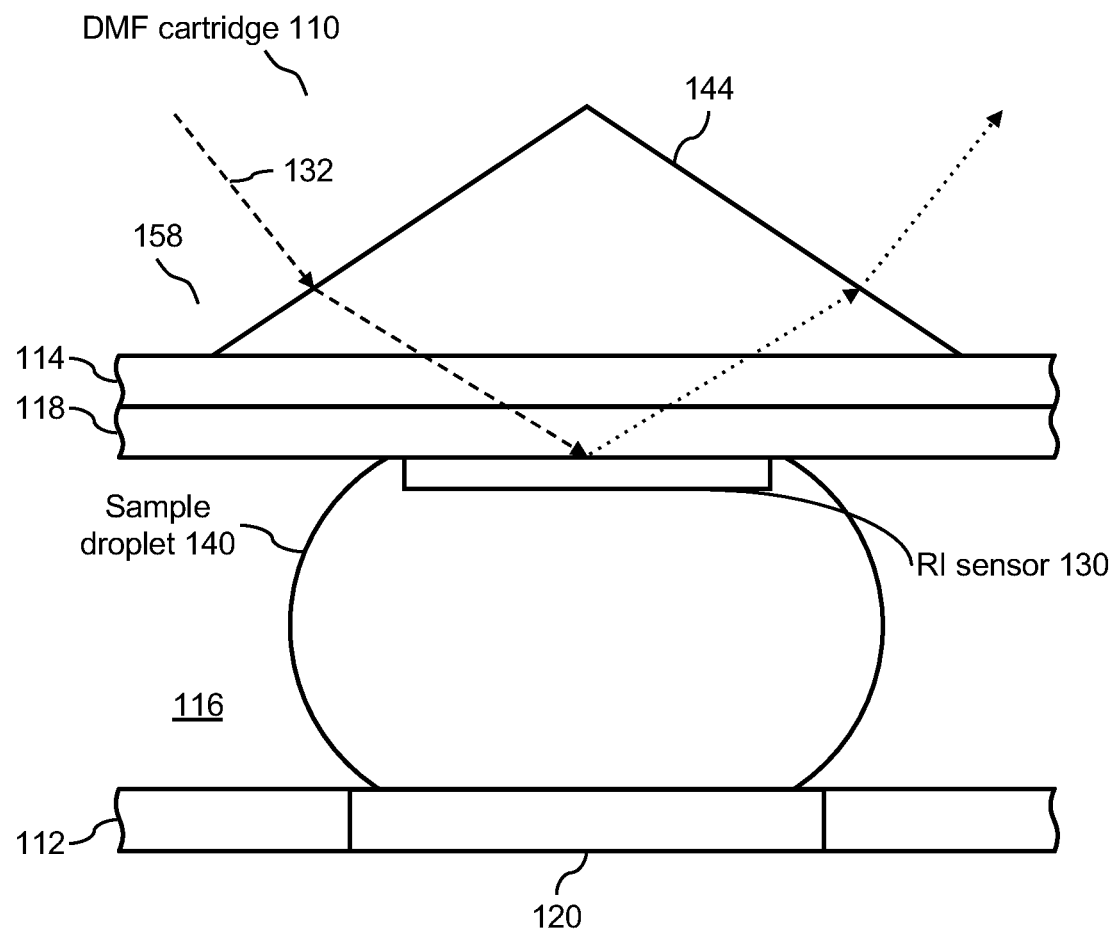
Figure 5:
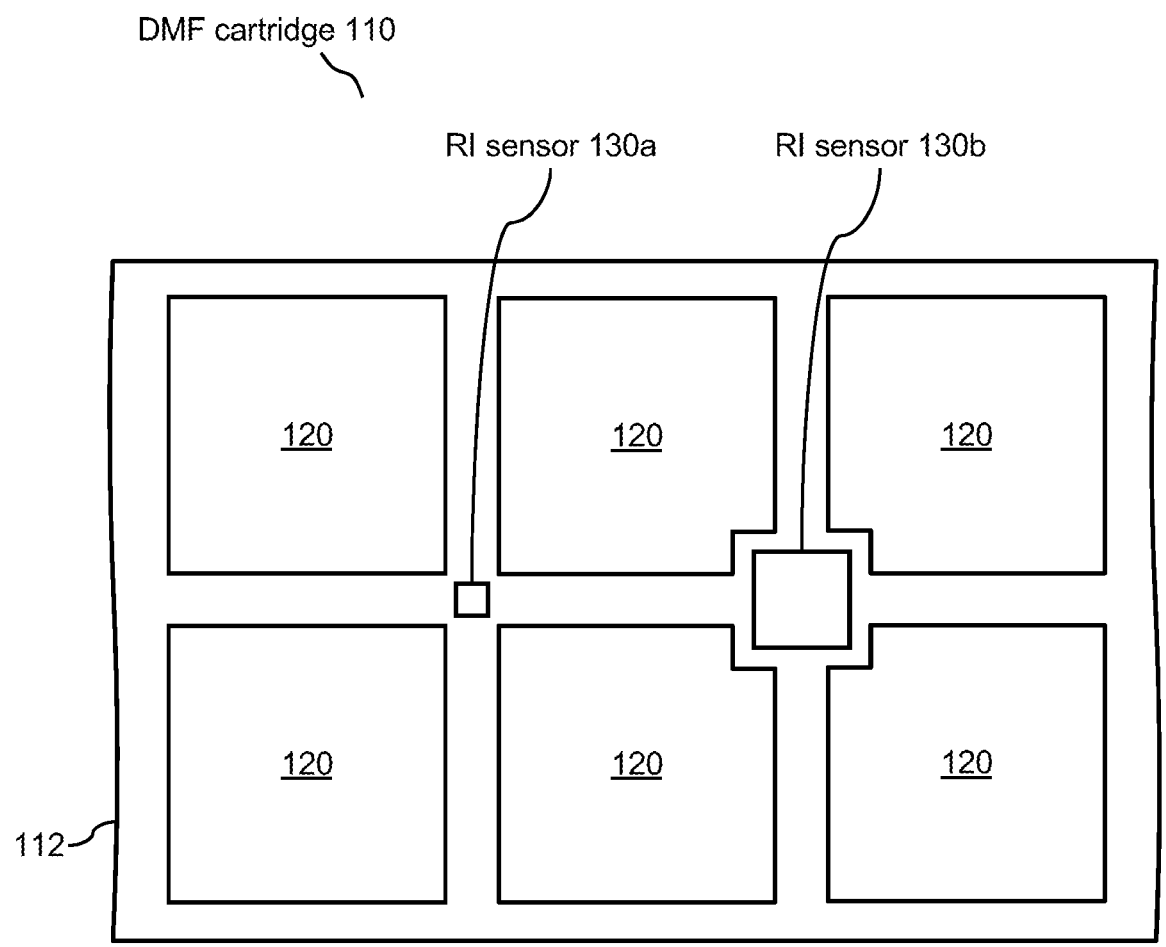
Figure 6:
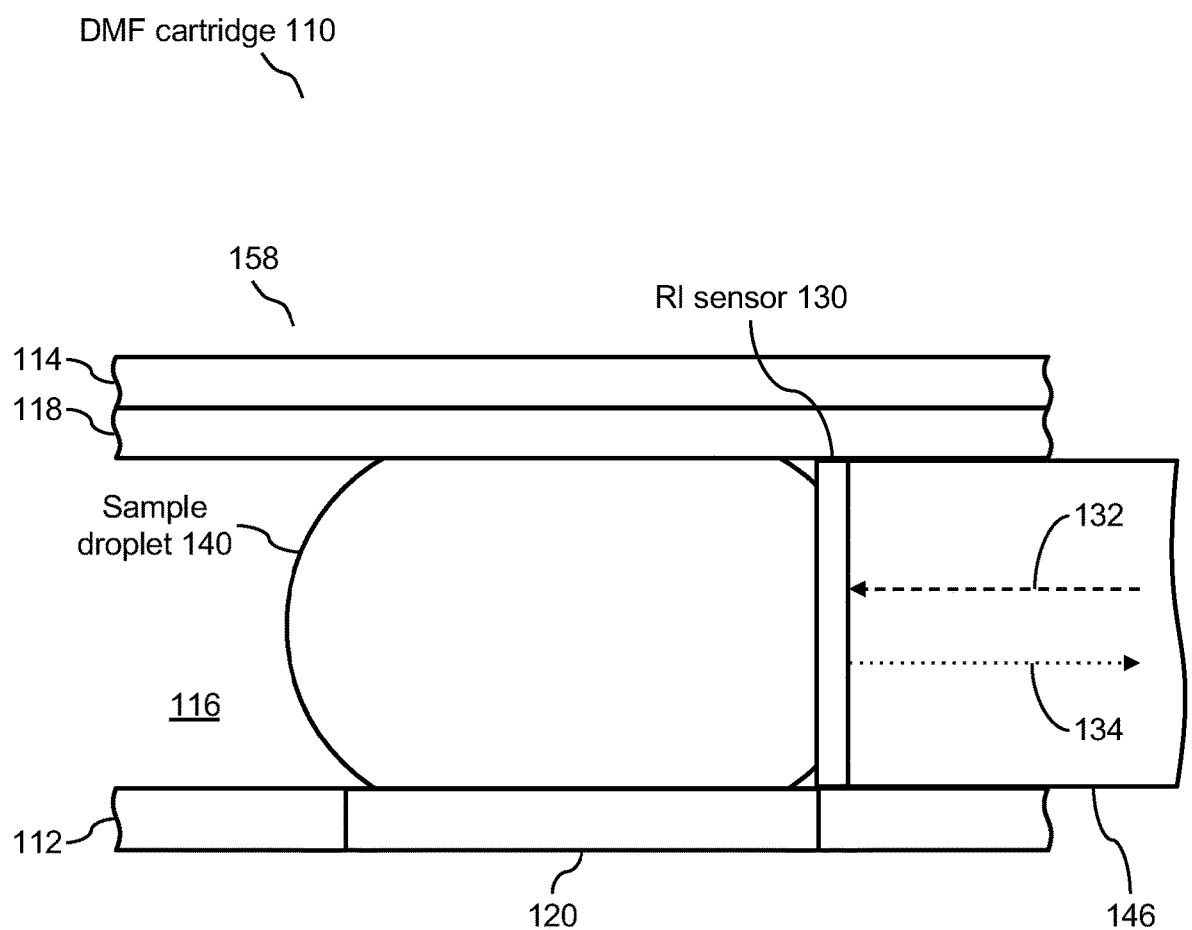
Figure 7A:
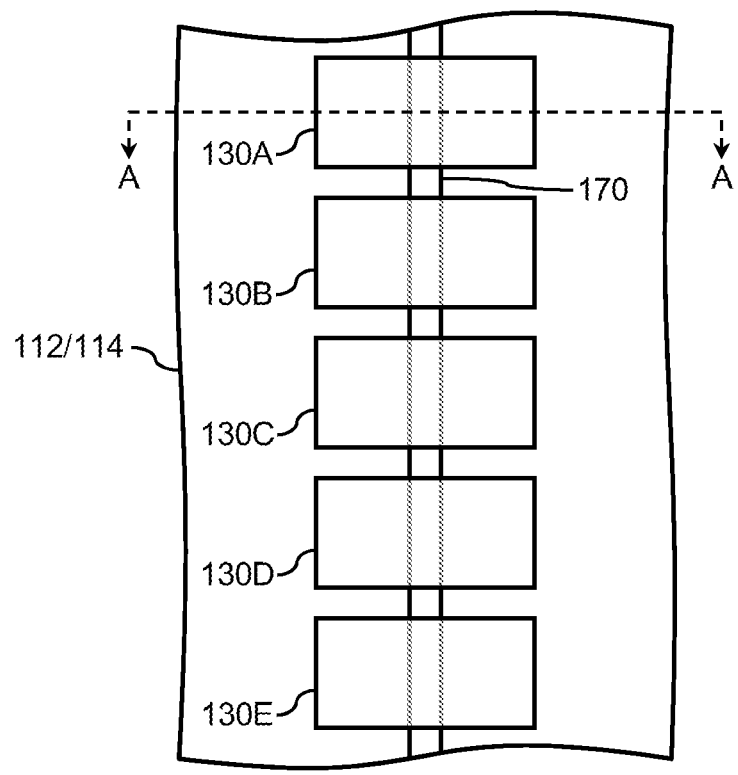
Figure 7B:
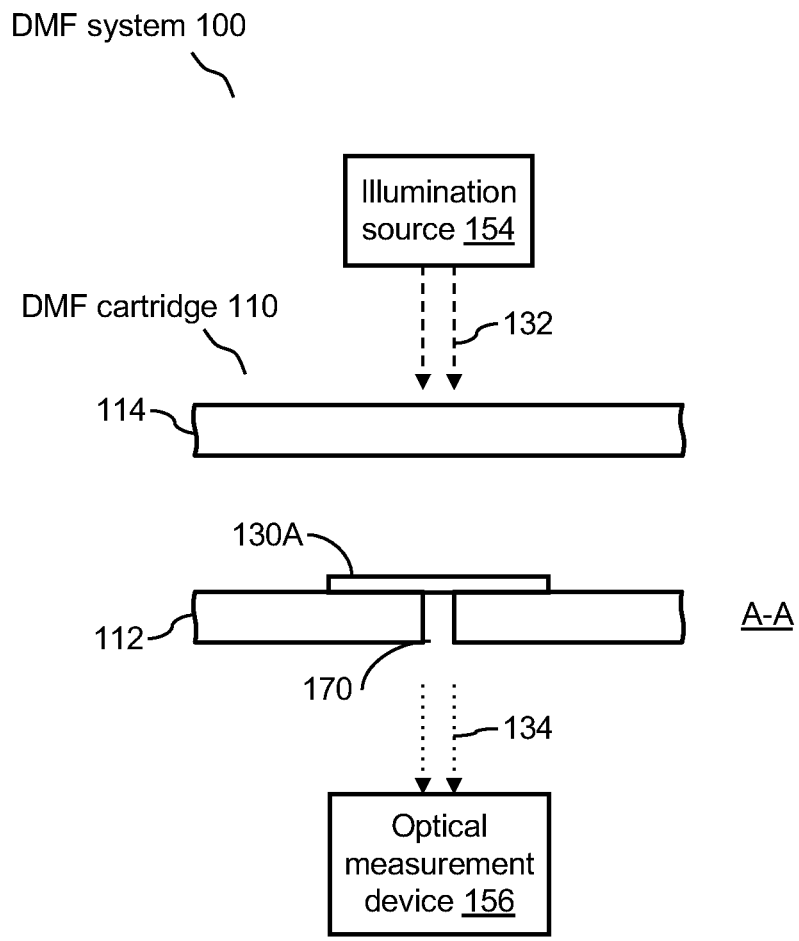
Figure 7C:
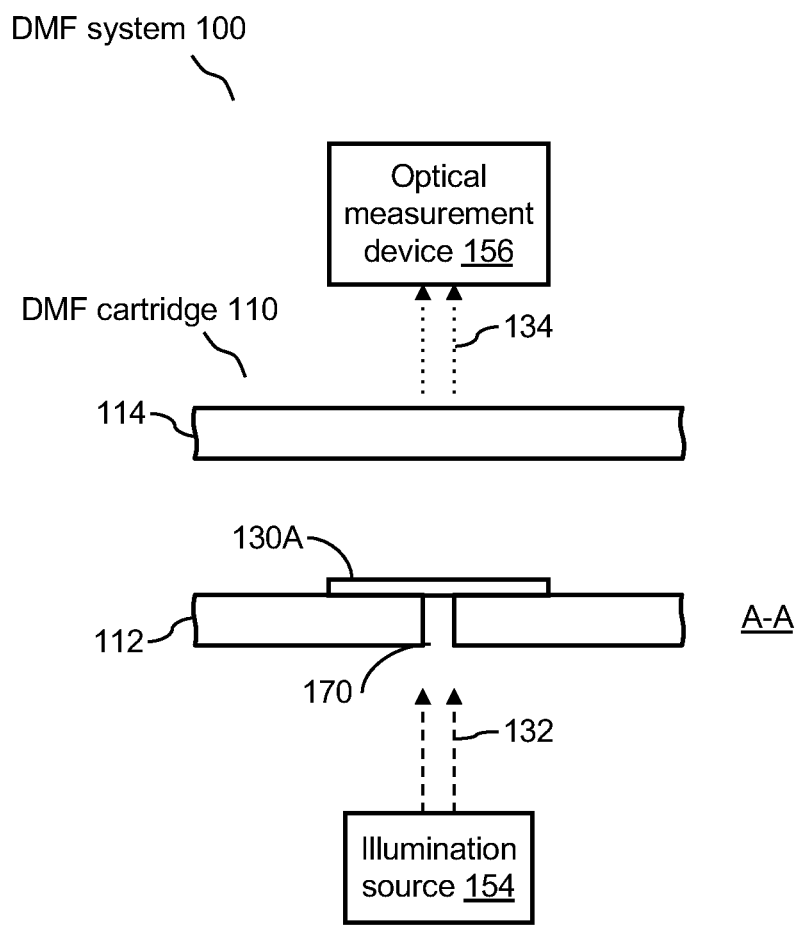
Figure 8A:
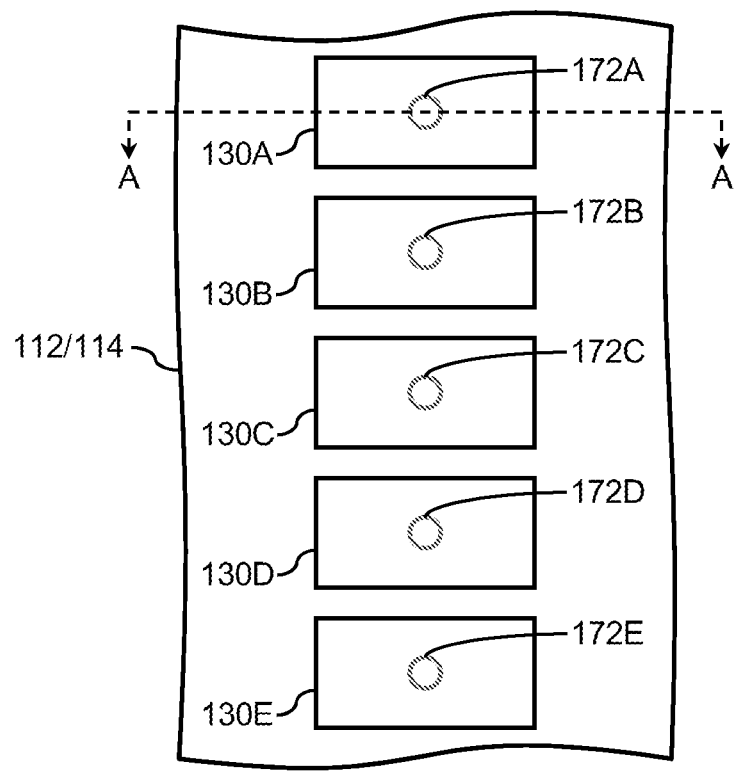
Figure 8B:
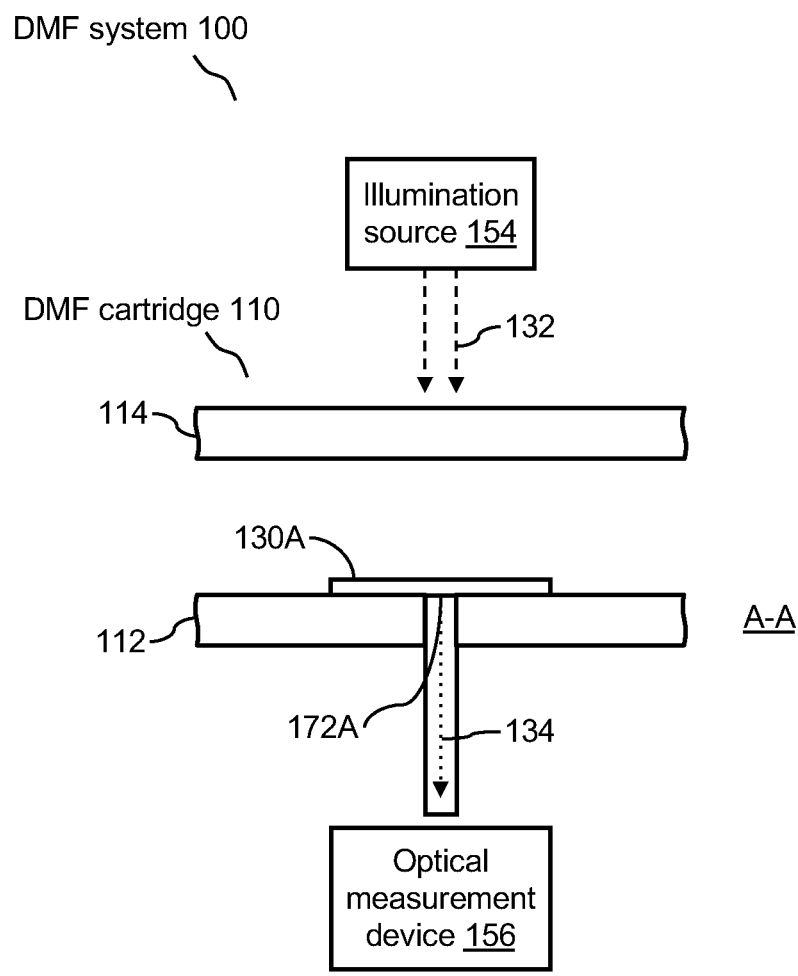
Figure 8C:
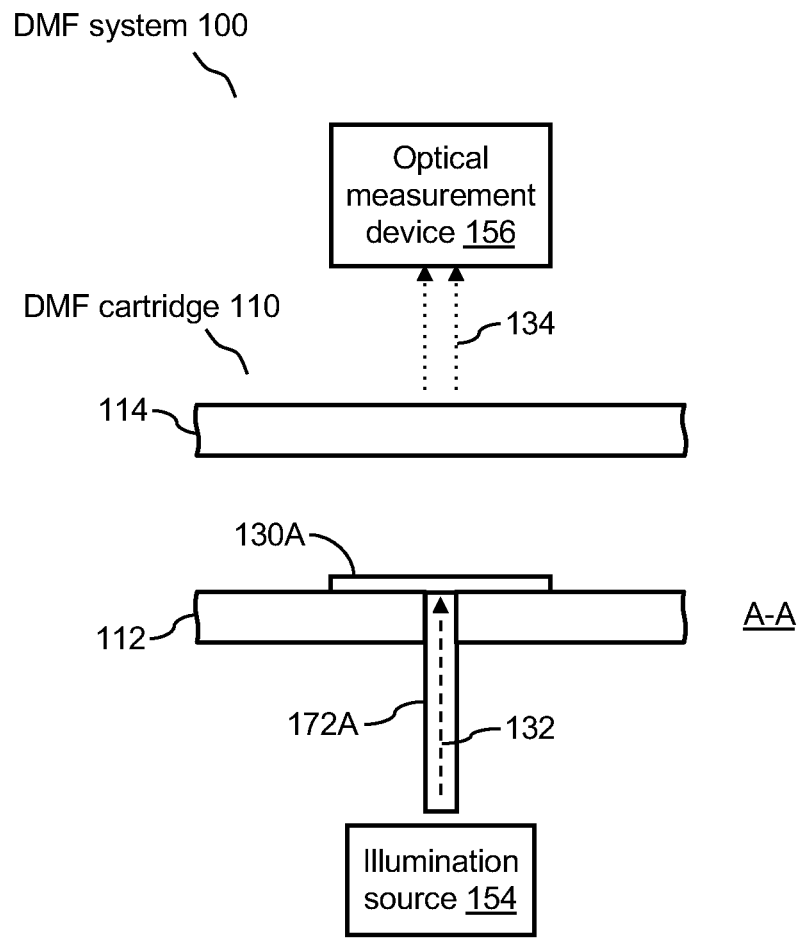
Figure 9:
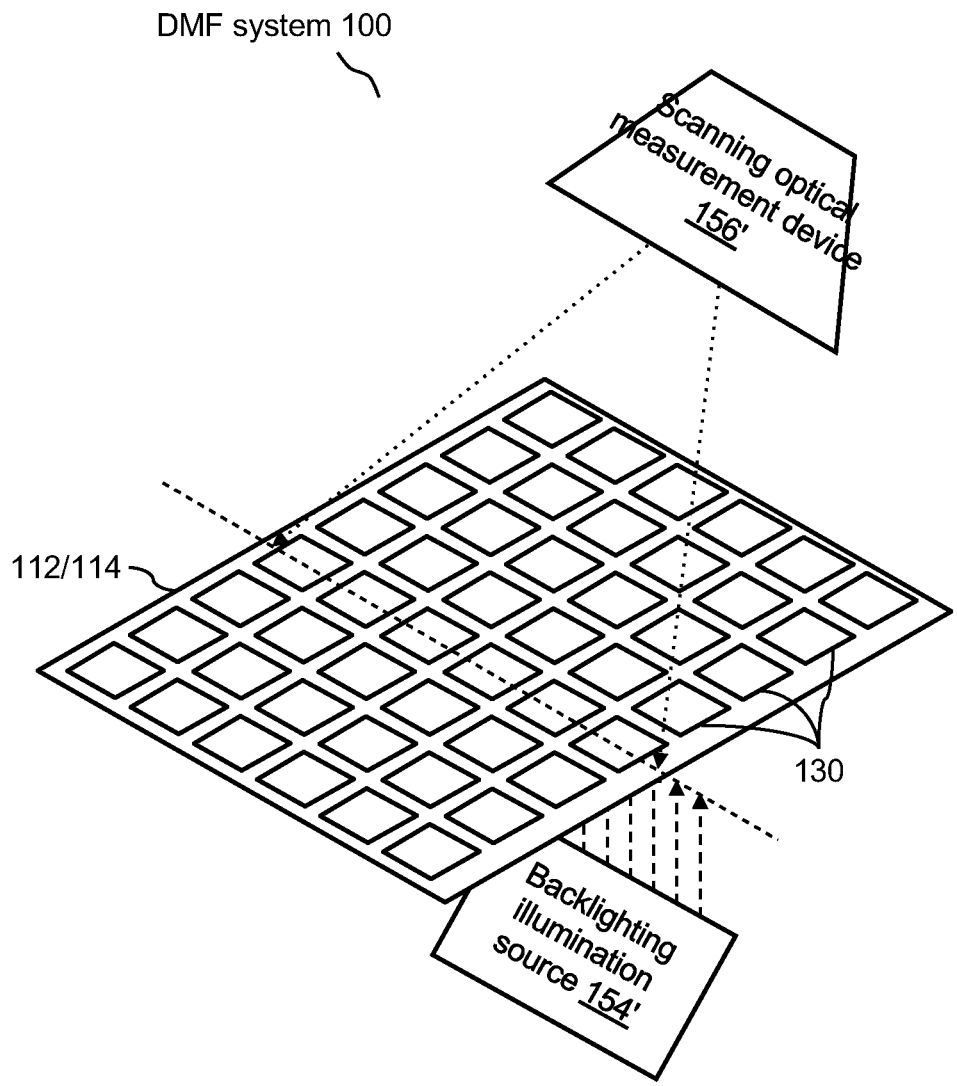
Figure 10:
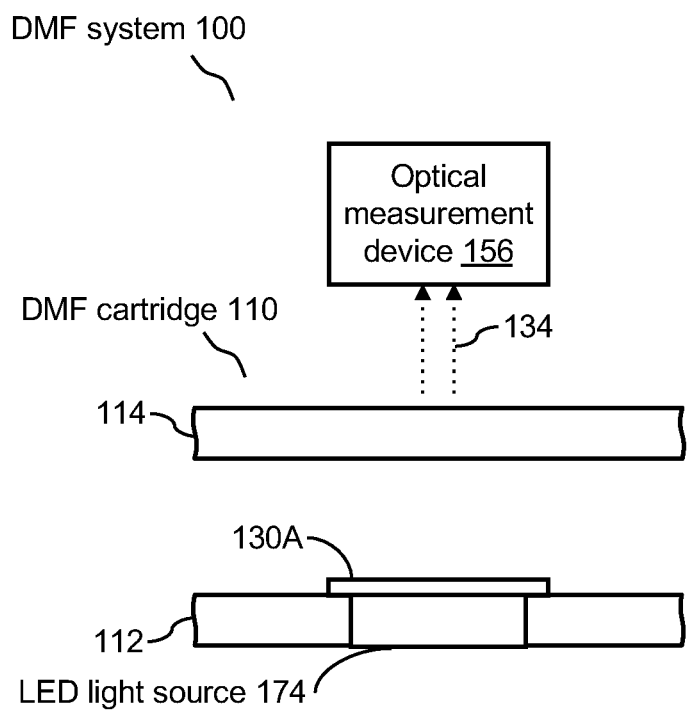
Figure 11:
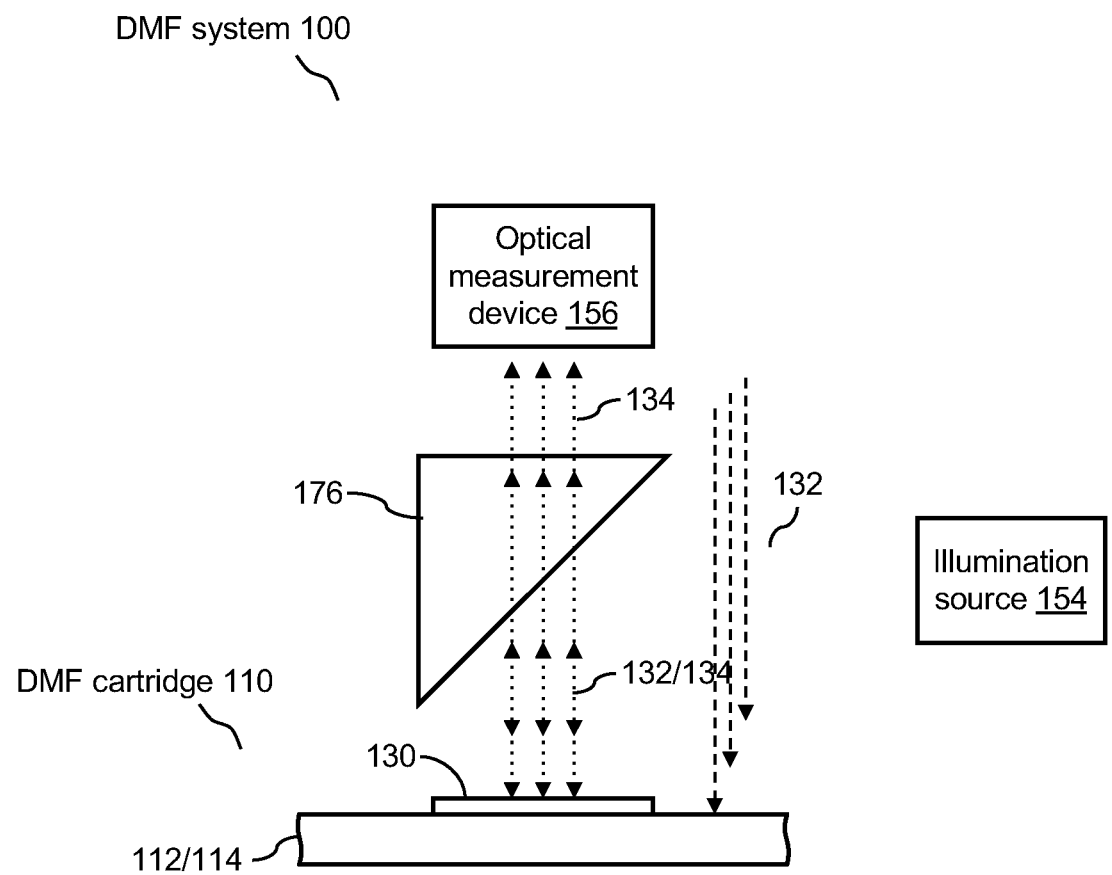
Figure 12:
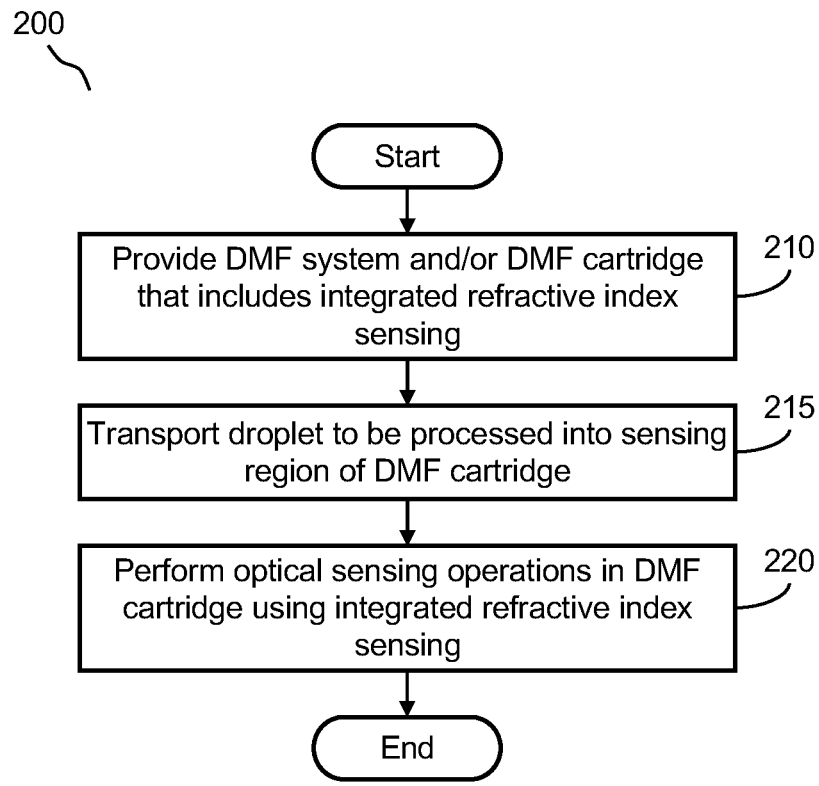

Having thus described the subject matter in general terms, reference will now be made to the accompanying drawings, which are not necessarily drawn to scale, and wherein:

FIG. 1 is a block diagram of an example of the DMF system that includes integrated RI sensing;

FIG. 2, FIG. 3, and FIG. 4 are side views of examples of a portion of the DMF cartridge of the DMF system and wherein an RI sensor is integrated into the top substrate therein;

FIG. 5 is a plan view of another example of a portion of the DMF cartridge of the DMF system and wherein an RI sensor is integrated into the bottom substrate therein;

FIG. 6 is a side view of another example of a portion of the DMF cartridge of the DMF system and wherein an RI sensor is integrated into the droplet operations gap therein;

FIG. 7A, FIG. 7B, and FIG. 7C is a top view and a first and second cross-sectional view, respectively, of an example of the DMF cartridge of the DMF system that includes multiple channels of integrated RI sensing;

FIG. 8A, FIG. 8B, and FIG. 8C is a top view and a first and second cross-sectional view, respectively, of another example of the DMF cartridge of the DMF system that includes multiple channels of integrated RI sensing;

FIG. 9 is a perspective view of an example of the DMF system that includes a scanning optical measurement device and back-lit illumination for interrogating multiple channels of integrated RI sensing;

FIG. 10 is a side view of an example of a portion of the DMF cartridge of the DMF system that includes an LED light source integrated into the substrate thereof and wherein the LED light source is an example of backlighting; and FIG. 11 is a side view of an example of the DMF system that includes front-lit illumination and integrated RI sensing; and FIG. 12 is a flow diagram of an example of a method of using the DMF system and/or DMF cartridge that includes integrated RI sensing.

DETAILED DESCRIPTION

The present disclosure provides a digital microfluidic (DMF) system, DMF cartridge, and method including integrated refractive index (RI) sensing. The digital microfluidic DMF system may include, for example, the DMF cartridge, one or more illumination sources, one or more optical measurement devices, and a controller. Additionally, one or more RI sensors may be provided directly in the droplet operations gap of the DMF cartridge.

In some embodiments, the DMF system, DMF cartridge, and method may provide one or more RI sensors on the top substrate, bottom substrate, both the top and bottom substrates, and/or between the top substrate and the bottom substrate of a DMF cartridge. In these embodiments, the bottom substrate may comprise electrowetting electrodes. In some examples, only the bottom substrate includes electrowetting electrodes.

In some embodiments, the DMF system, DMF cartridge, and method may provide optical elements to aid with the coupling of the light to the RI sensors. Example optical elements that may be used with the RI sensors may include, but are not limited to, one or more lenses, prisms, gratings, light sources, apertures, optical fibers, mirrors, or any combinations thereof.

In some embodiments, the present disclosure may provide one or more illumination sources for providing excitation light into the RI sensor and one or more optical measurement devices for receiving and processing emission light from the RI sensor.

In some embodiments, the present disclosure may provide multiple RI sensors for supporting multiple channels of RI sensing.

In some embodiments, the present disclosure may provide a scanning optical measurement device for interrogating multiple channels of integrated RI sensing.

In some embodiments, the present disclosure may provide backlighting (or back-lit illumination), front lighting (or front-lit illumination), or both backlighting and front lighting with the integrated RI sensing.

Additionally, the present disclosure provides a method of using the DMF system and DMF cartridge that includes integrated RI sensing is provided.

FIG. 1 is a block diagram of an example of the DMF system 100 that includes integrated RI sensing. DMF system 100 may be, for example, a plasmon resonance (PR) system and/or a localized surface plasmon resonance (LSPR) system for analysis of analytes. Analysis can mean, for example, detection, identification, quantification, or measuring analytes and/or the interactions of analytes with other substances, such as binding kinetics and thermodynamics. Exemplary analytes may include, but are not limited to, small molecules, proteins, peptides, atoms, ions, and the like. For example, DMF system 100 may be used to measure the binding kinetics of a ligand to a macromolecule, such as a receptor.

The DMF system 100 features the integration of RI-based sensors with digital microfluidics. For example, DMF system 100 may include a DMF cartridge 110. DMF cartridge 110 may be, for example, a droplet actuator device that provides DMF capabilities generally for conducting droplet operations, such as merging, splitting, dispensing, and diluting droplets. One application of these DMF capabilities is sample preparation. However, the DMF capabilities may be used for other processes, such as waste removal or flushing between runs. DMF cartridge 110 may include one or more detection spots 158 and wherein each detection spot 158 may include a RI sensor 130. More details of DMF cartridge 110, detection spot 158, and RI sensor 130 are shown and described below with reference to FIG. 2 through FIG. 11.

DMF system 100 may further include a controller 150, a DMF interface 152, an illumination source 154, and an optical measurement device 156. Controller 150 may be electrically coupled to the various hardware components of DMF system 100, such as to DMF cartridge 110, illumination source 154, and optical measurement device 156. For example, controller 150 may be electrically coupled to DMF cartridge 110 via DMF interface 152, wherein DMF interface 152 may be, for example, a pluggable interface for connecting mechanically and electrically to DMF cartridge 110. Together, DMF cartridge 110, controller 150, DMF interface 152, illumination source 154, and optical measurement device 156 form a DMF instrument 105.

Controller 150 may, for example, be a general-purpose computer, special purpose computer, personal computer, microprocessor, or other programmable data processing apparatus. Controller 150 serves to provide processing capabilities, such as storing, interpreting, and/or executing software instructions, as well as controlling the overall operations of DMF system 100. Controller 150 may be configured and programmed to control data and/or power aspects of these devices. For example, controller 150 controls droplet manipulation in DMF cartridge 110 by activating/deactivating electrodes. Generally, controller 150 may be used for any functions of DMF system 100. For example, controller 150 may be used to authenticate the DMF cartridge 110 in a fashion similar to how printer manufacturers check for their branded ink cartridges, controller 150 may be used to verify that the DMF cartridge 110 is not expired, controller 150 may be used to confirm the cleanliness of the DMF cartridge 110 by running a protocol for that purpose, and so on. The authentication of the cartridge may occur wirelessly using protocols such as bluetooth, NFC or other RFID based protocols.

Controller 150 may include one or more input interfaces that connect processing units to input devices. Input interfaces allow users of DMF system 100 to communicate commands to processor(s). One such exemplary command is the execution of program code. Input devices may take the form of keyboards, mouse devices, voice-activated systems, touch screens, and/or other suitable devices as will be known to a person of skill in the art.

In some embodiments, controller 150 may include one or more output interfaces connecting processing units to output devices, such as a graphical user interface (GUI). This enables DMF system 100 to communicate results of various processing operations to users, such as experiment results. Software instructions may be stored in memory unit(s) of controller 150 and may include conventional semiconductor random access memory (RAM) or other forms of memory known in the art; and/or software instructions may be stored in the form of program code on one or more computer readable-storage media, such as a hard drive, USB drive, read/write CD-ROM, DVD, tape drive, flash drive, optical drive, etc. These instructions may be executed in response to a user's interaction with DMF system 100 via an input device.

Additionally, in some embodiments, DMF cartridge 110 may include capacitive feedback sensing. Namely, a signal coming from a capacitive sensor that can detect droplet position and volume. Further, in other embodiments, DMF cartridge 110 may include a camera to provide optical measurement of the droplet position and volume, which can trigger controller 150 to re-route the droplets at appropriate positions.

Additionally, in some embodiments, DMF cartridge 110 may include heating zones (not shown) that may be individually controlled via controller 150. For example, heater devices, such as heater bars and/or resistive heating elements, may be positioned in relation to DMF cartridge 110 to provide the heating zones.

Additionally, DMF instrument 105 may be connected to a network. For example, controller 150 may be in communication with a networked computer 160 via a network 162. Networked computer 160 may be, for example, any centralized server or cloud server. Network 162 may be, for example, a local area network (LAN) or wide area network (WAN) for connecting to the internet.

In DMF system 100, illumination source 154 and optical measurement device 156 may be arranged relative to detection spot 158 and/or RI sensor 130 of DMF cartridge 110 such that illumination source 154 may illuminate detection spot 158 and optical measurement device 156 may detect light from detection spot 158. Illumination source 154 may be, for example, a light source for the visible range (wavelengths 400-800 nm), such as, but not limited to, a white light-emitting diode (LED), a halogen bulb, an arc lamp, incandescent sources, fluorescent sources, lasers, and the like. Illumination source 154 is not limited to a white light source. Illumination source 154 may be any color light that is useful in DMF system 100. Illumination source 154 may be monochromatic or polychromatic. Illumination source 154 may be coherent or incoherent. Illumination source 154 may be modulated to have an adjustable intensity very rapidly. Illumination source 154 may also contain one or more sensors, such as photodetectors, to regulate the brightness. Illumination source 154 may also include additional filters to ensure the quality of the incident light. Further, illumination source 154 may be a combination of multiple individual light emitting elements. These elements may be active at the same or different wavelengths. Illumination source 154 supplies excitation light 132 to detection spot 158 of DMF cartridge 110.

Optical measurement device 156 may be any optical transducer device used to obtain, for example, light intensity readings. Optical measurement device 156 receives and processes emission light 134 from the RI sensor 130 at each detection spot 158 of DMF cartridge 110. Optical measurement device 156 may be, for example, a charge coupled device, a photodetector, a photomultiplier, a spectrometer, a photodiode array, a camera, hyperspectral imagers, or any combinations thereof. Further, optical measurement device 156 may include optical filters to aid and enhance with the detection of the RI changes. Optical measurement device 156 may include additional components that allow for the control of illumination source 154 using closed loop control, such as correlators.

Further, DMF system 100 is not limited to one illumination source 154 and one optical measurement device 156 only. DMF system 100 may include multiple illumination sources 154 and/or multiple optical measurement devices 156 in order to support any detection operations required in DMF system 100 and/or DMF cartridge 110. The illumination source 154 may be multiples of the same source or different sources. The optical measurement systems 156 may be multiples of the same source or different sources.

Components of DMF system 100 and/or DMF instrument 105 (e.g., illumination source 154 and optical measurement device 156) may be optically coupled to detection spot 158 and/or RI sensor 130 of DMF cartridge 110 and may also be decoupled. The optical coupling/decoupling may be, for example, fiber optic connectors, fiber optic couplers, and/or free-space optical couplers.

In DMF system 100, DMF instrument 105, and/or DMF cartridge 110, RI sensor (or sensor surface) 130 means any methods of interrogating the RI of a droplet. RI sensor 130 may be, for example, in the form of a surface or it may be in the form of colloidal particles dissolved in the solution. Examples of RI sensing surfaces may include, but are not limited to, surface plasmon resonance, localized surface plasmon resonance, photonic crystals, thin-film interference filters, diffraction gratings, and the like.

In some embodiments, RI sensor 130 may include additional surfaces (not shown) on top of the RI sensing surface to enhance the selectivity of the surface. The selective surface serves the purpose of concentrating stimuli from the droplet directly onto the sensor surface. Examples of selective surfaces may include, but are not limited to, antibodies, aptamers, polymers or chemical groups.

FIG. 2, FIG. 3, and FIG. 4 show side views of examples of a portion of DMF cartridge 110 of DMF system 100 shown in FIG. 1 and wherein at least one RI sensor 130 is integrated into the top substrate therein. In this example, DMF cartridge 110 may include a bottom substrate 112 and a top substrate 114 separated by a droplet operations gap 116. Additionally, an arrangement of droplet operations electrodes 120 (e.g., electrowetting electrodes) may be provided atop bottom substrate 112. DMF cartridge 110 may include any lines or paths of droplet operations electrodes 120. A sample droplet 140 may be present in droplet operations gap 116 and atop a certain droplet operations electrode 120.

In one example, bottom substrate 112 may be a material that is substantially transparent to white light (or any color light). For example, bottom substrate 112 may be formed of glass, plastic, or a class of polymers known as thermoplastic elastomers (TPE). In another example, bottom substrate 112 may be a printed circuit board (PCB) that is substantially transparent or one that includes holes or openings that allow light transmission. Like bottom substrate 112, top substrate 114 may be formed of a material that is substantially transparent to white light (or any color light). For example, top substrate 114 may be formed of glass, plastic, or TPE. Further, the inner surface of top substrate 114 may be coated with a conductive layer 118, such as a transparent conductive layer (e.g., indium tin oxide (ITO), poly(3,4-ethylenedioxythiophene) polystyrene sulfonate (PEDOT:PSS)), or other similar transparent or non-transparent (e.g., opaque) conductive coatings. In other embodiments, all areas of DMF cartridge 110 need not include substantially transparent substrates and/or coatings or layers. For example, the substrates and/or coatings or layers may not be transparent, translucent, and/or opaque except in the region of detection.

The terms "top," "bottom," "over," "under," "in," and "on" are used throughout the description with reference to the relative positions of components of the DMF cartridge, such as relative positions of top and bottom substrates of the DMF cartridge. It will be appreciated that the DMF cartridge is functional regardless of its orientation in space. Therefore, "top," "bottom," etc., may be replaced with "first," "second," etc., without departing from the scope of the present disclosure.

In DMF cartridge 110, droplet operations gap 116 may be a space for processing any liquids of interest via droplet operations; liquids, such as, but not limited to, liquid reagents, buffer solution, sample fluid, and the like. The gap height (e.g., the spacing between the top substrate 114 and the bottom substrate 112) may be, for example, a few hundred microns. Droplet operations electrodes 120 may be used for performing droplet operations via electrowetting. "Droplet operation" means any manipulation of a droplet on a DMF device or cartridge. A droplet operation may, for example, include: loading a droplet into the digital fluidics device; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a droplet actuator; other droplet operations described herein; and/or any combination of the foregoing. Further, for controlling the temperature of processes occurring in droplet operations gap 116, a temperature control element (not shown), such as a Peltier heat pump, may be used in combination with DMF cartridge 110.

Referring now to FIG. 2, DMF cartridge 110 of DMF system 100 is shown wherein RI sensor 130 is provided on the surface of top substrate 114 that is facing the droplet operations gap 116. Accordingly, RI sensor 130 may interact directly in/with sample droplet 140, thereby forming a detection spot 158. RI sensor 130 may be an RI layer that is deposited on top substrate 114 to form a RI sensing surface on top substrate 114. RI sensor 130 may be designed to be small enough so as to not impede the hydrophobic surface of the substrate. Additionally, a hydrophobic layer (not shown) may be provided atop RI sensor 130 as part of the sensing film. The interrogation of RI sensor 130 (the sensing surface) may be done using illumination source 154 and optical measurement device 156 shown in FIG. 1. Similarly, the RI sensor 130 may be an RI layer that is deposited on the bottom substrate 112 to form a RI sensing surface on the bottom substrate 112. The RI sensor 130 may similarly be designed to be small enough not to impede the hydrophobic surface of the substrate. Additionally, the RI sensing surface may be designed to fit between electrowetting electrodes (whether provided in the top substrate 114 and/or bottom substrate 112) such that it can be more readily optically probed.

DMF cartridge 110 may be used to move droplets via droplet operations to and from detection spot 158. The integration of RI sensor 130 directly into droplet operations gap 116 and in the path of the sample droplets 140 allows for localized optical interrogation techniques. FIG. 2 shows excitation light 132 being delivered to RI sensor 130 and sample droplet 140. The interrogation of RI sensor 130 (the sensing surface) may be performed in transmission, reflection, and/or evanescent modes.

Again, RI sensor 130 means any methods of interrogating the RI of a droplet, such as sample droplet 140. RI sensor 130 may be, for example, in the form of a surface or it may be in the form of colloidal particles dissolved in the solution. Examples of RI sensing surfaces may include, but are not limited to, surface plasmon resonance, localized surface plasmon resonance, photonics crystals, thin-film interference filters, diffraction gratings, and the like. Further, RI sensor 130 may include additional surfaces on top of the RI sensing surface to enhance the selectivity of the surface. The selective surface serves the purpose of concentrating stimuli from the droplet directly onto the sensor surface. Examples of selective surfaces may include, but are not limited to, antibodies, aptamers, polymers or chemical groups.

Other optical elements may be provided in DMF cartridge 110 to aid with the coupling of the light to the RI sensors 130. Example optical elements that may be used with the RI sensors may include, but are not limited to, one or more lenses, prisms, gratings, light sources, apertures, optical fibers, mirrors, or any combinations thereof.

In one example, FIG. 3 shows a lens 142 installed in combination with RI sensor 130. Lens 142 is mounted in the path of excitation light 132. For example, lens 142 is mounted on the side of top substrate 114 opposite RI sensor 130 such that excitation light 132 first passes through lens 142, then through top substrate 114, and then to/through RI sensor 130.

In another example, FIG. 4 shows a prism 144 installed in combination with RI sensor 130. Prism 144 is mounted in the path of excitation light 132. For example, prism 144 is mounted on the side of top substrate 114 opposite RI sensor 130 such that excitation light 132 first passes through prism 144, then through top substrate 114, and then to/through RI sensor 130.

While FIG. 2, FIG. 3, and FIG. 4 show RI sensor 130 on top substrate 114, in other embodiments, RI sensor 130 may be on bottom substrate 112. For example, RI sensor 130 may be deposited on the surface of bottom substrate 112 facing the droplet operations gap 116. In DMF cartridge 110, even though bottom substrate 112 may be the substrate that includes the active droplet operations electrodes 120 for performing droplet operations, it may also contain the sensing surface, albeit arranged in a manner to avoid droplet pinning during droplet operations.

For example, FIG. 5 is a plan view of an example of RI sensors 130 integrated into bottom substrate 112. In this example, an RI sensor 130a and an RI sensor 130b is provided. RI sensor 130a is sized small enough to fit in the space between the droplet operations electrodes 120 without any modifications to the surrounding droplet operations electrodes 120. By contrast, RI sensor 130b is not sized small enough to fit in the space between the droplet operations electrodes 120 without any modifications to the droplet operations electrodes 120. Accordingly, each of the four surrounding droplet operations electrodes 120 requires a corner notch that provides clearance for fitting RI sensor 130b.

In yet another example, FIG. 6 shows a waveguiding layer 146 that is provided in droplet operations gap 116 between bottom substrate 112 and top substrate 114 and substantially parallel to the plane of DMF cartridge 110. In this example, RI sensor 130 is provided on the tip of waveguiding layer 146 that is in droplet operations gap 116. In one example, waveguiding layer 146 may be optical fiber. This configuration may be termed a side-entry RI sensor. Excitation light 132 is directed to RI sensor 130 via the waveguiding layer 146. Then, emission light 134 is returned through the same waveguiding layer 146. In this example, the interrogation of RI sensor 130 (the sensing surface) may be performed in reflection mode. Measurements may also be made in evanescent mode. One or multiple evanescent wave based refractive index sensors (for example Fiber Bragg gratings, Mach-Zehnder interferometers, Fabry Pérot etalons) may be arranged along the waveguide. These sensors may be independently read out thus allowing simultaneous capture of multiple sensors.

Further, while FIG. 2 through FIG. 6 describe the DMF cartridge 110 as manipulating droplets via electrowetting methods (e.g., using droplet operations electrodes 120), this is exemplary only. In other embodiments, droplets may be manipulated in DMF cartridge 110 via other methods, such as, but not limited to, optical methods, magnetic methods, thermocapillary methods, surface acoustic wave methods, other electrical methods such as dielectrophoresis, and the like, and any combinations thereof.

In operation, the excitation light 132 from illumination source 154 is directed to RI sensor 130. RI sensor 130 conducts the incident light to the droplet (e.g., sample droplet 140) being interrogated. Emission light 134 is then returned to optical measurement device 156 for processing. Again, the interrogation of RI sensor 130 (the sensing surface) may be performed in transmission, reflection, and/or evanescent modes.

In DMF system 100, DMF instrument 105, and/or DMF cartridge 110 multiple different architectures for readout of the one or more RI sensors 130 is possible. Examples of which are shown below with reference to FIG. 7A through FIG. 11.

Referring now to FIG. 7A, FIG. 7B, and FIG. 7C is a top view and a first and second cross-sectional view, respectively, of an example of DMF cartridge 110 of DMF system 100 that includes multiple channels of integrated RI sensing. For example, DMF system 100 may include X or more channels of integrated RI sensing, where for example, X=2, 3, 4, 5, 6, 7, 8, 9, 10, 12, 20, 30, 40, or 50. In this example, DMF cartridge 110 includes multiple RI sensors 130, wherein each RI sensor 130 correlates to a RI sensing channel.

For example, multiple RI sensors 130 (e.g., RI sensors 130A, 130B, 130C, 130D, 130E) are arranged along a line in DMF cartridge 110. An aperture 170 spans across the line of multiple RI sensors 130, as shown in FIG. 7A. The aperture 170 is provided, for example, in a bottom substrate 112 of a DMF cartridge 110, as shown in FIG. 7B and FIG. 7C. Accordingly, the illumination may be shone through the aperture 170 and across the line of multiple RI sensors 130. The aperture 170 may be required in embodiments in which bottom substrate 112 is not optically transparent.

FIG. 7B and FIG. 7C are cross-sectional views taken along line A-A of FIG. 7A. FIG. 7B shows a configuration in which illumination source 154 is arranged on the top substrate 114-side of DMF cartridge 110 and optical measurement device 156 is arranged on the bottom substrate 112-side. In this example, the aperture 170 provides an opening for emission light 134 to pass through bottom substrate 112 to optical measurement device 156. By contrast, FIG. 7C shows a configuration in which optical measurement device 156 is arranged on the top substrate 114-side of DMF cartridge 110 and illumination source 154 is arranged on the bottom substrate 112-side. In this example, the aperture 170 provides an opening for excitation light 132 to pass through bottom substrate 112 to illumination source 154.

In either configuration shown in FIG. 7B and FIG. 7C, optical measurement device 156 may sample RI sensors 130A, 13B, 130C, 130D, 130E through the opening provided by the aperture 170. Optical measurement device 156 may be, for example, a line-scan hyperspectral imager (e.g., hyperspectral imaging (HSI) camera) thus allowing the simultaneous capture of the spectra from each of the discrete sensor spots independently. In another example, optical measurement device 156 may include elements that can alter its field of view (e.g., scanning mirrors or spatial light modulators), thus allowing the temporal separation of capture for each of the channels.

Referring now to FIG. 8A, FIG. 8B, and FIG. 8C is a top view and a first and second cross-sectional view, respectively, of another example of DMF cartridge 110 of DMF system 100 that includes multiple channels of integrated RI sensing. This configuration is substantially the same as that shown in FIG. 7A, FIG. 7B, and FIG. 7C, except that the aperture 170 is replaced with individual optical fibers 172. For example, optical fibers 172A, 172B, 172C, 172D, 172E correlate with RI sensors 130A, 13B, 130C, 130D, 130E, respectively.

In this example, optical fibers 172 may be bottom-entry fibers that are introduced through the bottom substrate 112 as shown in FIG. 8B, and FIG. 8C. Each RI sensor 130 forms a layer on the tip of the optical fiber 172. The respective optical fibers 172 may be taken to either one or multiple optical measurement devices 156 (in FIG. 8B) or illumination sources 154 (in FIG. 8C). The multiple optical fibers 172 may be arranged in any arbitrary pattern (not necessary in a line).

While FIG. 8B, and FIG. 8C show operation in transmission mode, in another example, the multiple optical fibers 172 may be interrogated in reflection mode (with the excitation light 132 and emission light 134 coupled and read out in the same direction). Further, while FIG. 8A, FIG. 8B, and FIG. 8C show the multiple optical fibers 172 installed in bottom substrate 112, in another example, the multiple optical fibers 172 may be installed in top substrate 114.

Referring now to FIG. 9 is a perspective view of an example of DMF system 100 that includes a scanning optical measurement device and back-lit illumination for interrogating multiple channels of integrated RI sensing. For example, DMF system 100 may include a scanning optical measurement device 156' and a backlighting illumination source 154'. In one example, scanning optical measurement device 156' may be a line-scan hyperspectral imager (e.g., hyperspectral imaging (HSI) camera) that acquires data from one or multiple RI sensors 130 arranged in a line. RI sensors 130 are located between backlighting illumination source 154' and scanning optical measurement device 156' (thus arranged in a backlit configuration). In this configuration, the line of RI sensors 130 may be scanned "remotely" with the slit located in scanning optical measurement device 156'.

In one example, backlighting illumination source 154' may be in the form of LEDs integrated into DMF cartridge 110 or it may be in the form of a remote illumination source. For example, FIG. 10 shows an LED light source 174 installed in bottom substrate 112 of DMF cartridge 110.

Referring now to FIG. 11 is a side view of an example of DMF system 100 that includes front-lit illumination and integrated RI sensing. For example, in this configuration of DMF system 100, the measurement is performed using coaxial illumination (i.e., illumination on the same side of the RI sensor 130 as the optical measurement device). In one example, optical measurement device 156 may be the scanning optical measurement device 156'. In one example, illumination source 154 may be in the form of light sources arranged around the collection optics of optical measurement device 156. In another example, illumination source 154 may be in the form of a beamsplitter 176 that allows for perfectly coaxial illumination. Other illumination techniques, such as bright field imaging and diffuse imaging, may be used to maximize the performance of the system.

In another embodiment of DMF system 100 including integrated RI sensing, DMF system 100 includes linear optical transducers (e.g., linear optical measurement devices 156). In this example, either the RI sensors 130 or the field of view of the linear optical transducer is moved in a direction perpendicular to the line being scanned (thus enabling pushroom data acquisition). This allows DMF system 100 to use a line-scan system to obtain a 2-dimensional image. This may be combined with the previous embodiments thus allowing the distribution of the sensor surface in any arbitrary 2D pattern.

In yet another embodiment of DMF system 100 including integrated RI sensing, DMF system 100 includes spatio-spectral optical transducers (e.g., spatio-spectral optical measurement devices 156) that can simultaneously acquire 2D images of the RI sensors 130 as well as spectrally resolved images. This allows the real-time acquisition of data arbitrarily from a 2D sensor surface. This may be combined with either backlit or front-lit illumination.

Referring now to FIG. 12 is a flow diagram of an example of a method 200 of using the DMF system 100 and/or DMF cartridge 110 that includes integrated RI sensing. Method 200 may include, but is not limited to, the following steps.

At a step 210, a DMF system and/or DMF cartridge that includes integrated RI sensing is provided. For example, the DMF system 100 and/or DMF cartridge 110 that includes RI sensor 130 integrated in the droplet operations gap 116 of DMF cartridge 110 is provided, as shown, for example, in FIG. 2 through FIG. 11.

At a step 215, a droplet to be processed is transported into the sensing region of the DMF cartridge. For example and referring now to FIG. 2 through FIG. 11, a sample droplet 140 to be processed may be transported using droplet operations into detection spot 158 of DMF cartridge 110, wherein detection spot 158 is at RI sensor 130.

At a step 220, optical sensing operations are performed in the DMF cartridge using integrated RI sensing. For example and referring now to FIG. 2 through FIG. 11, optical sensing operations are performed in DMF cartridge 110 using RI sensor 130 integrated in the droplet operations gap 116 of DMF cartridge 110, illumination source 154 and optical measurement device 156. In operation, the excitation light 132 from illumination source 154 is directed to RI sensor 130. RI sensor 130 conducts the incident light to the droplet (e.g., sample droplet 140) being interrogated. Emission light 134 is then returned to optical measurement device 156 for processing. The interrogation of RI sensor 130 (the sensing surface) may be performed in transmission, reflection, and/or evanescent modes.

In summary and referring now again to FIG. 1 through FIG. 11, the DMF system 100, DMF cartridge 110, and/or method 200 uses RI sensors 130 integrated directly into a disposable cartridge (e.g., DMF cartridge 110) to allow for localized optical interrogation techniques. Compared with conventional methods, the integration of RI sensing with digital microfluidics in DMF system 100, DMF cartridge 110, and/or method 200 allows for localized optical interrogation techniques.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that may be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter. For example, the term "about," when referring to a value may be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The present disclosure may be implemented using hardware, software, or a combination thereof and may be implemented in one or more computer systems or other processing systems. In one aspect, the present disclosure is directed toward one or more computer systems capable of carrying out the functionality described herein.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Terms like "preferably," "commonly," and "typically" are not utilized herein to limit the scope of the claimed embodiments or to imply that certain features are critical or essential to the structure or function of the claimed embodiments. These terms are intended to highlight alternative or additional features that may or may not be utilized in a particular embodiment of the present disclosure.

The term "substantially" is utilized herein to represent the inherent degree of uncertainty that may be attributed to any quantitative comparison, value, measurement, or other representation and to represent the degree by which a quantitative representation may vary from a stated reference without resulting in a change in the basic function of the subject matter at issue.

The terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

The terms "comprise," "comprises," "comprising," "include," "includes," and "including," are intended to be non-limiting, such that recitation of items in a list is not to the exclusion of other like items that may be substituted or added to the listed items.

Various modifications and variations of the disclosed methods, compositions and uses of the present disclosure will be apparent to the skilled person without departing from the scope and spirit of the present disclosure. Although the present disclosure has been disclosed in connection with specific preferred aspects or embodiments, it should be understood that the present disclosure as claimed should not be unduly limited to such specific aspects or embodiments.

What is claimed is:

1. A cartridge for use with an instrument, the cartridge comprising:
   digital microfluidics comprising a plurality of electrowetting electrodes operative to perform droplet operations on a liquid droplet in a droplet operations gap of the cartridge; and
   a refractive index sensor configured to form a thin-film interference filter, the refractive index sensor exposed to the droplet operations gap in proximity with one or more of the electrowetting electrodes such that a droplet situated atop the one or more of the electrowetting electrodes will contact the refractive index sensor, an arrangement of the one or more of the electrowetting electrodes and the refractive index sensor establishing a droplet interrogation site.

2. The cartridge of claim 1, wherein the cartridge comprises a top plate and the refractive index sensor is mounted on a top plate.

3. The cartridge of claim 1, wherein the refractive index sensor is mounted in the droplet operations gap.

4. The cartridge of claim 1, wherein the droplet operations gap is established by a top plate and a bottom plate in substantially parallel planes, and wherein the refractive index sensor is mounted in the droplet operations gap and has a sensor face that is at a right angle to the substantially parallel planes.

5. The cartridge of claim 1, wherein the refractive index sensor is provided as a tip of a waveguide.

6. The cartridge of claim 1, further comprising X or more refractive index sensing channels, wherein X≥2.

7. The cartridge of claim 1, further comprising X or more optical fibers, where X≥2.

8. The cartridge of claim 1, further comprising X or more refractive index sensing channels, wherein X≥10.

9. The cartridge of claim 1, further comprising a lens mounted opposite the refractive index sensor and droplet operations gap.

10. A system comprising:
    a cartridge according to claim 1; and
    an instrument comprising electronics for controlling the cartridge and a means for mounting the cartridge to effect electronic coupling and control.

11. The system of claim 10, further comprising one or more illumination sources configured to illuminate the droplet interrogation site or sites.

12. The system of claim 10, further comprising one or more optical measurement devices arranged to detect light from the droplet interrogation site or sites.

13. The system of claim 10, further comprising an illumination source and an optical measurement device arranged with respect to a droplet interrogation site to operate in reflection mode.

14. The system of claim 10, further comprising an illumination source and an optical measurement device arranged with respect to a droplet interrogation site to operate in reflection mode.

15. The system of claim 10, further comprising a scanning optical measurement device configured to scan multiple droplet interrogation sites.

16. The system of claim 10, wherein the illumination source is integrated into the cartridge.

17. The system of claim 10, wherein the illumination source comprises a light-emitting diode integrated into the cartridge.

18. The system of claim 10, wherein the illumination source comprises a coaxial illumination source.

19. A method comprising providing a system according to claim 10;
    loading a sample droplet into the droplet operations gap;
    conducting one or more sample processing steps on the sample droplet to yield an analysis-ready droplet; and
    conducting a refractive index analysis of analysis-ready droplet at a droplet interrogation site.

20. The method of claim 19, wherein one or more of the loading operation or the one or more sample processing steps is conducted using electrowetting-mediated droplet operations.

* * * * *